(No Model.)
J. W. SPANGLER.
FEED MECHANISM FOR FERTILIZER DISTRIBUTERS.
No. 364,969. Patented June 14, 1887.
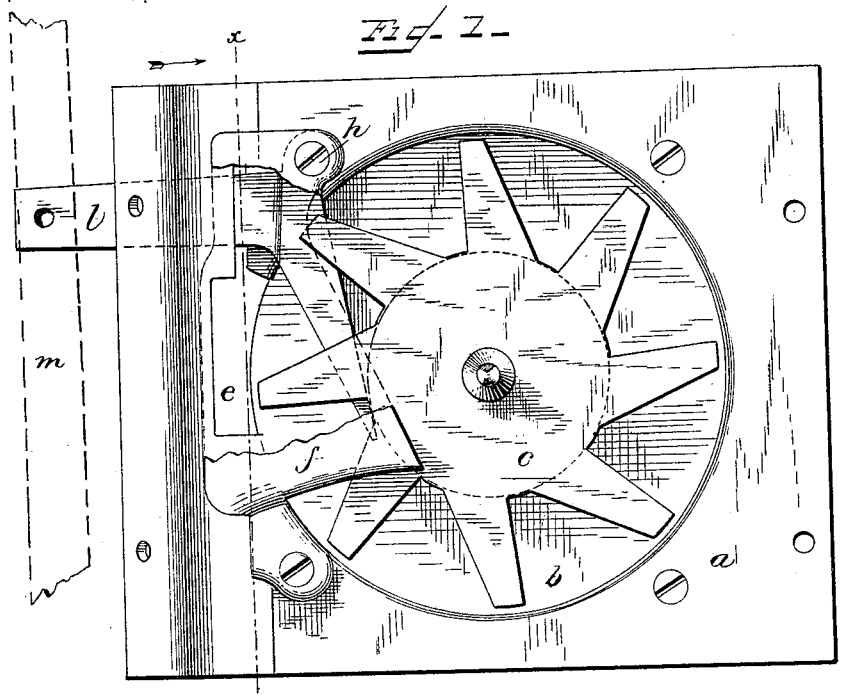
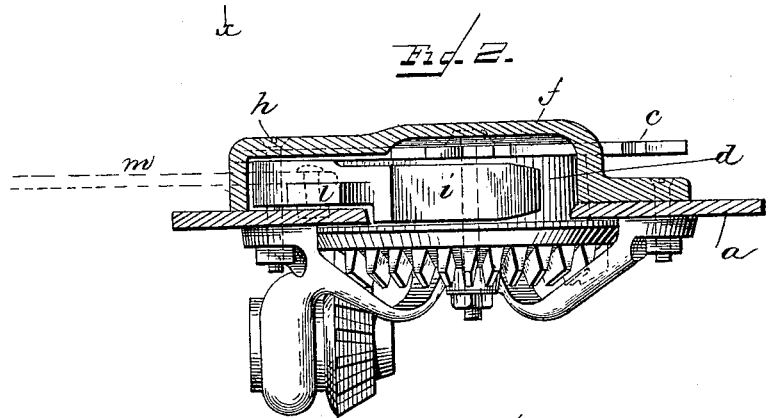
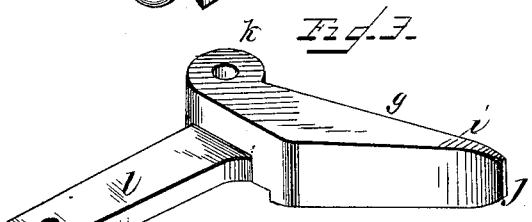
Witnesses
F. L. Ourand
Harry Y. Davis
Inventor
Jacob W. Spangler
By his Attorney
Wm N. Finckel

UNITED STATES PATENT OFFICE.

JACOB W. SPANGLER, OF YORK, PENNSYLVANIA.

FEED MECHANISM FOR FERTILIZER-DISTRIBUTERS.

SPECIFICATION forming part of Letters Patent No. 364,969, dated June 14, 1887.

Application filed December 14, 1886. Serial No. 221,501. (No model.)

*To all whom it may concern:*

Be it known that I, JACOB W. SPANGLER, a citizen of the United States, residing at York, in the county of York and State of Pennsylvania, have invented certain new and useful Improvements in Feed Mechanism for Fertilizer-Distributers, of which the following is a full, clear, and exact description.

This invention relates to feeding devices or the feed mechanism proper of machines for distributing fertilizing material, more especially pulverulent fertilizer.

The object of the invention is to secure a more perfect control of the discharge of the fertilizer from the hopper.

So far as I am aware, the feed mechanisms heretofore in use which have employed a discharge gate or regulator and a device for preventing the adhering of the fertilizer to the feed mechanism—such last-named device being usually termed a "scraper"—have had such regulator or gate and scraper as two individual and separately-operated parts.

Now, my invention consists in a combined gate or regulator and scraper constructed and arranged substantially as hereinafter particularly set forth and claimed.

In the accompanying drawings, in the several figures of which like parts are similarly designated, Figure 1 is a plan view with the cap over the discharge-orifice broken away. Fig. 2 is a vertical section on the line $x\ x$ of Fig. 1, looking in the direction of the arrow; and Fig. 3 is a perspective view of my combined regulator and scraper detached.

I have shown my invention applied to the feed-wheel shown in my patent of April 1, 1884, No. 296,239; but I wish to say that while it is designed for force feeds I do not thereby limit my invention to its application to the form of feed mechanism shown in said patent. Nevertheless, I will proceed to describe the said invention as applied to said patented feed mechanism. The bed-plate $a$, the discous base $b$, the toothed wheel $c$, the wall $d$ between the discous base and the toothed wheel, and the discharge-throat $e$ may be as in the patent aforesaid; and so, also, the cap $f$ of the discharge-throat may be of substantially the same construction as that shown in said patent.

I do not describe the means for rotating the feed-wheel, but have indicated them in Fig. 2, and they may be as those shown or of any other approved construction.

Beneath the cap $f$, I arrange my combined regulator and scraper $g$ and pivot it upon a bolt, $h$, which secures one end of the cap to the bed-plate. This combined regulator and scraper consists of a finger, $i$, brought to an edge or point at its free end $j$, and of a width or height to fit in between the discous base and the toothed crown, and adapted to be thrown less or more across the trough in the feed mechanism in which the fertilizer is fed to the exit by the toothed portion $c$, to vary the width of said trough between the wall $d$ and the discharge orifice and to entirely close such orifice, to thus expand or extend and contract or confine the pathway for the outgoing fertilizer impelled by the toothed crown to the discharge-orifice, and to completely shut off the exit. This finger $i$ thus acts as and subserves all the purposes of a gate to regulate the quantity of fertilizer discharged; but in addition to this function said finger also acts as and performs the office of a scraper to prevent the fertilizer from sticking to the feed mechanism or clogging in the trough at the point of discharge, its edge $j$ cutting the mass, and not only so, but inasmuch as the width of the finger vertically is substantially the same as the height of the wall $d$—that is to say, extending from the discous base to the underside of the toothed crown—it prevents the massing of the fertilizer between them. When thrown wide open, as indicated in Fig. 1, the finger rests against and in close contact with the wall $d$ and keeps it clean; or, to state the operation in another way, where the feed mechanism has parts moving past the gate and scraper both above and below it the gate and scraper are kept clean and prevented from sticking. In old forms of gates or scrapers oftentimes the parts became so rusted from the acid and moisture of the fertilizer as to cause them to stick, and hence be moved only with great difficulty. This cannot occur with my device. Heretofore it was usual to have the scraper stationary and use a sliding gate, and such gates have been most liable to stick from rust. A hub, $k$, is provided for this gate and scraper to receive the bolt $h$, upon which it is vibrated; but I do not limit my invention to the use of such pivoting devices, and esteem as within my invention any suitable pivoting means, or, in other words, any means which will permit the movement of the gate and scraper across the trough. An arm, l, may extend from the finger i out through the feed mechanism and be connected with a suitable rod, m, (shown in dotted lines, Figs. 1 and 2,) for vibrating or adjusting the regulator and scraper; and where several feed mechanisms are used on a machine the regulators and scrapers of all of them will be connected to a single operating-rod common to all, to operate or adjust all alike and simultaneously. I have shown the pivotal bolt h as one of the fastenings of the cap f, and for economy and convenience prefer so to utilize such bolt.

By my invention I accomplish with one device the functions heretofore performed by two separate and independently-actuated devices, and perform them equally as efficiently, if not more so.

What I claim is—

1. A force-feed mechanism for distributing fertilizing material, comprising a feeding device, substantially such as set forth, which positively moves the fertilizer to the exit, a trough or pathway along which the material is impelled, and a combined gate and scraper co-operating with the feeding device and arranged in the trough or pathway next the discharge orifice or exit to regulate the quantity discharged, cut off the feed, and keep clear the parts from accumulation of fertilizer, substantially as described.

2. A fertilizer-distributer feed mechanism comprising a rotary base and an attached positively-acting forcing device, and a finger shaped to fit and arranged within the trough or pathway of the outgoing material, and between the base and forcing members of the mechanism for moving outward the mass, to regulate the quantity discharged, cut off the feed, and prevent the accumulation of fertilizer on the parts, substantially as described.

3. A feed mechanism comprising a rotary base and toothed crown separated by an upright wall, and a combined gate and scraper interposed between them and next the discharge-orifice, and an operating-rod for said combined gate and scraper, substantially as described.

4. A force-feed mechanism for fertilizer-distributers having a forcing device and a discharge-orifice, and a cap overhanging the forcing device and orifice, combined with a combined gate and scraper pivoted within said cap, substantially as described.

5. A force-feed mechanism for fertilizer-distributers having a forcing device and a discharge-orifice, and a cap overhanging the forcing device and orifice, combined with a combined gate and scraper and one of the fastening-bolts of said cap, which also constitutes the pivot of said gate and scraper, substantially as described.

6. The combined gate and scraper consisting of a finger to operate in a trough or pathway of a fertilizer feed mechanism, in conjunction with the discharge-orifice having a hub pivoted in such feed mechanism and an operating-arm extended beyond the feed mechanism for a connection with an actuating device, in combination with a force-feed mechanism comprising a rotary base, a toothed crown, and connecting-wall, substantially as set forth.

In testimony whereof I have hereunto set my hand this 9th day of December, A. D. 1886.

JACOB W. SPANGLER.

Witnesses:
WM. BEITZEL,
WALTER B. WHITE.